Sept. 26, 1933.  W. G. KOUPAL  1,928,023

GLASS ROLLING APPARATUS

Filed May 6, 1932  2 Sheets-Sheet 1

INVENTOR
Walter G. Koupal
By Bradley & Bee
Attys.

Sept. 26, 1933.  W. G. KOUPAL  1,928,023
GLASS ROLLING APPARATUS
Filed May 6, 1932  2 Sheets-Sheet 2

INVENTOR
Walter G. Koupal
By Bradley & Bee Attys.

Patented Sept. 26, 1933

1,928,023

UNITED STATES PATENT OFFICE 1,928,023

GLASS ROLLING APPARATUS

Walter G. Koupal, Tarentum, Pa., assignor to Pittsburgh Plate Glass Company, a corporation of Pennsylvania Application May 6, 1932. Serial No. 609,563

1 Claim. (Cl. 49—33)

Figure 2:
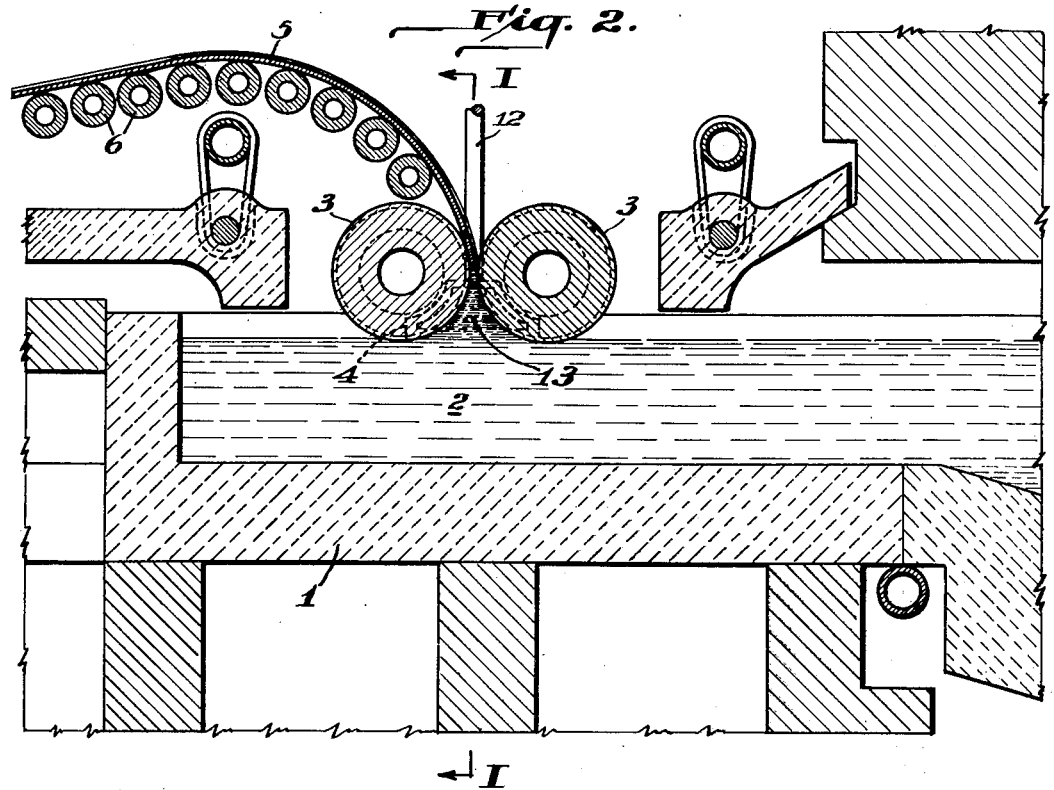
Figure 1:
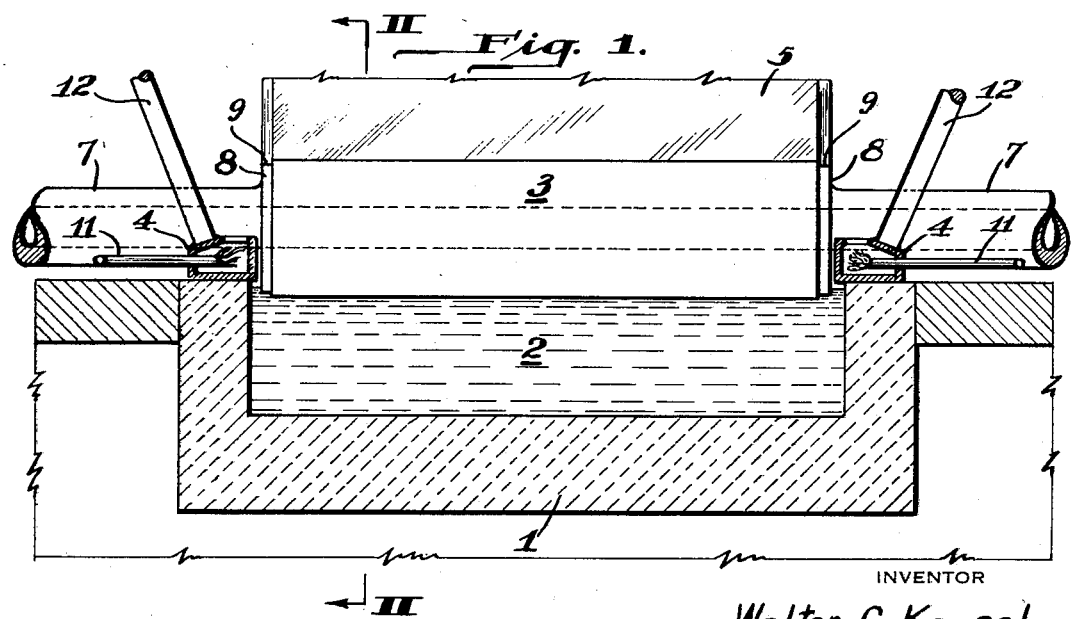
Figure 3:
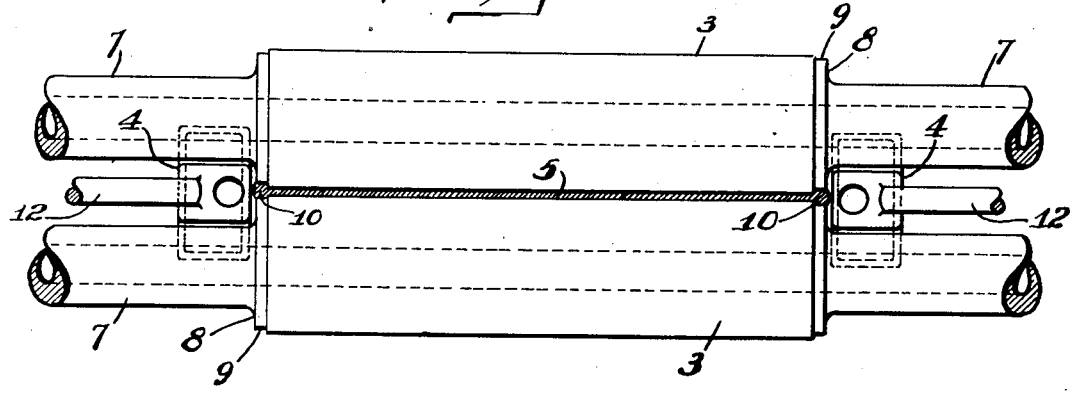
Figure 5:
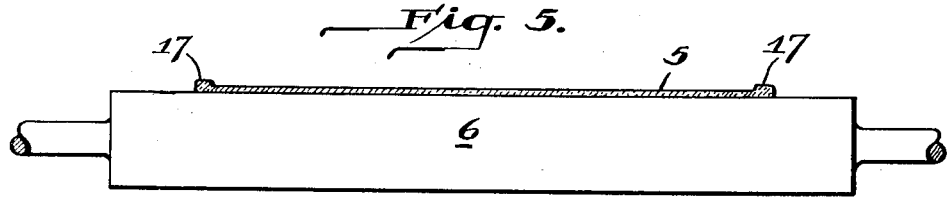
Figure 4:
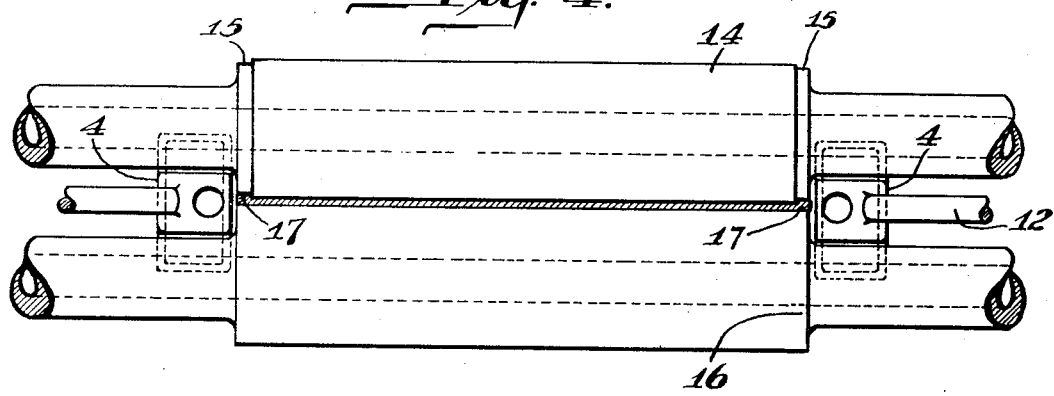

The invention relates to glass rolling apparatus of the general type shown in the Gelstharp patent Reissue No. 16,856, dated July 17, 1928, in which a glass sheet is formed continuously between a pair of sizing rolls whose peripheries engage the surface of a molten body of glass. Some difficulty is encountered in the use of this apparatus in securing a smooth, uniform edge free from small cracks or vents, which tend to cause breakage as the glass passes through the annealing leer. This is due to the glass becoming too hard at the edges incident to the greater cooling effect of the atmosphere on these portions of the sheet than upon the body of the sheet inward from the edges, and incident to the fact that the glass bath next to the edges of the pot from which the edges are formed is cooled more rapidly because of the pot wall than the body of the bath inward from the wall. The object of the invention is to overcome the difficulty as to hard edges. This is accomplished by forming the ends of the rolls so that the edges of the sheet are thickened into beads. This additional glass prevents the edges from cooling as fast as the ordinary edge which is thinner. The thickened edge also withdraws the glass more rapidly from the bath at the sides of the pot so that there is a more rapid flow to this point than would otherwise be the case, thus reducing the tendency of the glass to chill and devitrify due to its proximity to the sides of the pot. As a result the edges of the sheet are softer, smoother, and freer from fine cracks than is the case with the ordinary rolled sheet. Certain embodiments of the invention are illustrated in the accompanying drawings, wherein:

Figure 1 is a vertical section on the line I—I of Fig. 2. Fig. 2 is a vertical section on the line II—II of Fig. 1. Fig. 3 is a plan view. Fig. 4 is a plan view illustrating a modification. And Fig. 5 is a detail view showing the glass as it passes over the leer.

Referring to the drawings, 1 is a draw pot or container containing a body of molten glass 2 communicating with a suitable melting tank, not shown; 3, 3 are a pair of sizing rolls having their peripheries in engagement with the body of glass in the pot; 4, 4 are closure members at the ends of the rolls, usually referred to as "guns"; and 5 is a glass sheet which is being formed and carried over the apron rolls 6 to a suitable roller leer, not shown.

Each of the sizing rolls comprises a body portion with the spindles 7, 7 at the ends thereof mounted in suitable bearings which are not shown. The spindles are of smaller diameter than the body portion of the rolls 8, 8 in opposition to the side walls of the tank and relatively close thereto. These shoulders are grooved at their edges, as indicated at 9, 9, thus providing a space for the formation of the beads 10 on the glass sheet. The guns 4, 4 are preferably hollow and provided with gas pipes 11 by means of which the guns are heated. These guns are supported upon suitable brackets 12 and are positioned with their faces in close proximity to the shoulders 8, 8 and forming a closure for the V-space 13 between the rolls. The grooves 9, 9 in conjunction with the guns govern the size and shape of the beads 10 so that these beads are perfectly uniform in shape and the sheet is always exactly the same width since this is determined by the distance between the guns.

The provision of the beads on the sheet is advantageous for the reasons heretofore pointed out. The increased mass of glass at the edges of the sheet keeps the edge hotter than would otherwise be the case so that such edge is softer and less liable to fire cracks. The edge is hotter because its greater mass holds the heat longer than a thinner edge and gives the glass supplied to the groove from the bath a higher temperature than is the case where a thin edge is formed upon the sheet. This is due to the fact that the flow of glass in the bath to the edges is increased by reason of their greater mass.

Fig. 4 illustrates a modification in which only the roll 14 is provided at its shoulder with the groove 15, the shoulder 16 of the opposing roll not being grooved out. Due to this modification, the bead 17 is formed off center with respect to the center line of the sheet and for this reason the construction of Figs. 1 to 3 is preferred. The construction of Fig. 4 is the preferred one in that the bead projects on one side only of the plane of the glass so that when the glass passes over the leer rolls on the side which does not have the projections due to the beads, it will lie perfectly flat from edge to edge, as indicated in Fig. 5.

What I claim is:

In combination in glass rolling apparatus, a pair of horizontal sizing rolls, each comprising a body portion terminating in shoulders with spindles extending outward from said shoulders, a container adapted to carry a body of molten glass with its side walls in opposition to said shoulders, and a heated metal gun at each end of the pair of rolls mounted on the side walls above the level of the glass in the container in opposition to said shoulders and closing the end of the V-space between the rolls, said rolls being reduced in diameter at their corners so that space is provided between such corners and the guns for the formation of a bead at each edge of the glass sheet being formed between the rolls.

WALTER G. KOUPAL.